(12) United States Patent
Spangler

(10) Patent No.: US 9,803,489 B2
(45) Date of Patent: Oct. 31, 2017

(54) LOW LOSS BAFFLED SERPENTINE TURNS

(71) Applicant: United Technologies Corporation, Hartford, CT (US)

(72) Inventor: Brandon W. Spangler, Vernon, CT (US)

(73) Assignee: UNITED TECHNOLOGIES CORPORATION, Hartford, CT (US)

(*) Notice: Subject to any disclaimer, the term of this patent is extended or adjusted under 35 U.S.C. 154(b) by 293 days.

(21) Appl. No.: 14/752,143

(22) Filed: Jun. 26, 2015

(65) Prior Publication Data

US 2016/0376897 A1    Dec. 29, 2016

(51) Int. Cl.
*F01D 9/04* (2006.01)
*F01D 5/18* (2006.01)
*F01D 5/02* (2006.01)
*F01D 25/12* (2006.01)

(52) U.S. Cl.
CPC .............. *F01D 9/041* (2013.01); *F01D 5/02* (2013.01); *F01D 5/187* (2013.01); *F01D 5/188* (2013.01); *F01D 5/189* (2013.01); *F01D 25/12* (2013.01); *F05D 2220/32* (2013.01); *F05D 2230/232* (2013.01); *F05D 2240/126* (2013.01); *F05D 2250/185* (2013.01); *F05D 2260/22141* (2013.01); *Y02T 50/676* (2013.01)

(58) Field of Classification Search
CPC ........... F01D 5/187; F01D 5/188; F01D 5/189
See application file for complete search history.

(56) References Cited

U.S. PATENT DOCUMENTS

| 4,025,226 A * | 5/1977 | Hovan ............... F01D 5/186 415/115 |
| 6,416,275 B1 | 7/2002 | Itzel et al. |
| 8,757,961 B1 | 6/2014 | Liang |
| 2014/0075947 A1 | 3/2014 | Gautschi et al. |

OTHER PUBLICATIONS

Extended European Search Report dated Nov. 9, 2016 in European Application No. 16167093.0.

* cited by examiner

*Primary Examiner* — Kenneth Bomberg
*Assistant Examiner* — John S Hunter
(74) *Attorney, Agent, or Firm* — Snell & Wilmer L.L.P.

(57) ABSTRACT

A vane includes a forward rib and an aft rib positioned axially aft of the forward rib. The vane also includes a middle rib positioned axially between the forward rib and the aft rib, such that the forward rib and the middle rib define a forward passage configured to receive a forward baffle and the middle rib and the aft rib define an aft passage configured to receive an aft baffle. The vane also includes an inner surface extending axially from the forward rib to the aft rib, being radially separated from the middle rib via a gap such that air can flow between the aft passage and the forward passage via the gap, and having a radially outward curve from the forward rib to the middle rib and having a radially inward curve from the middle rib to the aft rib.

20 Claims, 6 Drawing Sheets

LOW LOSS BAFFLED SERPENTINE TURNS

GOVERNMENT LICENSE RIGHTS

This disclosure was made with government support under FA 8650-09-D-2923 0021 awarded by The United States Air Force. The government has certain rights in the disclosure.

FIELD

The present disclosure relates generally to cooling systems for gas turbine engines and, more particularly, to a serpentine turn within an airfoil and space-eater baffles for use therein.

BACKGROUND

Gas turbine engines typically include a fan section, a compressor section, a combustor section and a turbine section. The turbine section includes multiple stages of blades and vanes. As fluid flows through the turbine section, the flow causes the blades to rotate about an axis of rotation. The vanes, positioned between each row of blades, are used to redirect the flow in order to maximize the power received by the downstream blades. Temperatures within the turbine section may be relatively high, as the flow of fluid is received initially from the combustor section of the gas turbine engine. In order to compensate for the relatively high temperatures, the vanes may define internal passages that receive a flow of coolant such that the coolant can reduce temperatures of exterior surfaces of the vanes. Some of these passages may include serpentine turns which allow the coolant to flow in multiple directions prior to flowing out the vane.

SUMMARY

What is described is a vane for use in a gas turbine engine that an axis of rotation. The vane includes a forward rib and an aft rib positioned axially aft of the forward rib. The vane also includes a middle rib positioned axially between the forward rib and the aft rib, such that the forward rib and the middle rib define a forward passage configured to receive a forward baffle and the middle rib and the aft rib define an aft passage configured to receive an aft baffle. The vane also includes an inner surface extending axially from the forward rib to the aft rib, being radially separated from the middle rib via a gap such that air can flow between the aft passage and the forward passage via the gap, and having a radially outward curve from the forward rib to the middle rib and having a radially inward curve from the middle rib to the aft rib.

In any of the foregoing vanes, in response to the forward passage receiving the forward baffle and the aft passage receiving the aft baffle, air may flow between the aft passage and the forward passage on a circumferential side of at least one of the aft baffle or the forward baffle.

In any of the foregoing vanes, the radially outward curve and the radially inward curve are positioned at an outer diameter edge of the vane.

In any of the foregoing vanes, the vane further defines two passages forward of the forward rib and two passages aft of the aft rib.

Any of the foregoing vanes may include a collar extending radially outward from the inner surface, wherein in response to the forward passage receiving the forward baffle, the collar being positioned adjacent the forward baffle on a circumferential side of the forward baffle.

In any of the foregoing vanes, the collar is configured to be coupled to the forward baffle via welding.

Any of the foregoing vanes may include the forward baffle and the aft baffle overlapping at a location radially outward from the middle rib.

In any of the foregoing vanes, the forward baffle may include a first circumferential side and a second circumferential side defining a slot at an aft end of the forward baffle and the aft baffle may include a forward tapered end configured to be received by the slot, the slot and the forward tapered end being positioned radially outward from the middle rib.

In any of the foregoing vanes, a seal may be formed between the tapered end and the forward baffle that remains sealed in response to at least one of the forward baffle or the aft baffle moving forward or aft.

In any of the foregoing vanes, at least one of the radially outward curve or the radially inward curve may have a radius of curvature between 0.25 inches and 0.35 inches.

Also described is a system for reducing pressure loss in a serpentine turn of a vane of a gas turbine engine having an axis of rotation. The system includes a forward baffle configured to be received by a forward passage of the vane that is separated from an aft passage of the vane by a middle rib. The middle rib is separated from an inner surface of the vane by a gap. The forward baffle has a first circumferential side and a second circumferential side and a slot therebetween on an aft end of the forward baffle. The slot is positioned radially outward from the middle rib. The system also includes an aft baffle configured to be received by an aft passage of the vane and having a forward tapered end radially outward from the middle rib and configured to be received by the slot.

Any of the foregoing systems may also include the vane having the forward passage and the aft passage, such that the forward baffle is received by the forward passage and the aft baffle is received by the aft passage, and such that a seal is formed radially outward from the middle rib by the tapered end being received by the slot.

In any of the foregoing systems, the seal may remain intact in response to at least one of the forward baffle or the aft baffle moving forward or aft.

Any of the foregoing systems may also include a forward rib positioned axially forward of the middle rib and an aft rib positioned axially aft of the middle rib, such that the inner surface extends axially from the forward rib to the aft rib and has a radially outward curve from the forward rib to the middle rib and having a radially inward curve from the middle rib to the forward rib.

In any of the foregoing systems, at least one of the radially outward curve or the radially inward curve may have a radius of curvature between 0.25 inches and 0.35 inches.

In any of the foregoing systems, the radially outward curve and the radially inward curve are positioned at an outer diameter edge of the vane.

Any of the foregoing systems may also include a collar extending radially outward from the inner surface, such that in response to the forward passage receiving the forward baffle, the collar is positioned adjacent the forward baffle on either circumferential side of the forward baffle and is configured to be coupled to the forward baffle.

Also described is a turbine section of a gas turbine engine. The turbine section includes a rotor configured to rotate in response to a flow of air and a vane. The vane includes a forward rib and an aft rib positioned axially aft of the forward rib. The vane also includes a middle rib positioned axially between the forward rib and the aft rib, such that the forward rib and the middle rib define a forward passage and the middle rib and the aft rib defining an aft passage. The vane also includes a forward baffle positioned in the forward slot and having a first circumferential side and a second circumferential side and a slot therebetween on an aft end of the forward baffle, the slot being positioned radially outward from the middle rib. The vane also includes an aft baffle having a forward tapered end radially outward from the middle rib and configured to be received by the slot, forming a seal such that air cannot flow through the aft baffle and the forward baffle. The vane also includes an inner surface extending axially from the forward rib to the aft rib, being radially separated from the middle rib via a gap such that air can flow between the aft passage and the forward passage via the gap, and having a radially outward curve from the forward rib to the middle rib and having a radially inward curve from the middle rib to the aft rib.

In any of the foregoing turbine sections, the inner surface may be straight at a first location radially outward from the forward baffle and may be straight at a second location radially outward from the aft baffle when the forward passage receives the forward baffle and the aft passage receives the aft baffle.

In any of the foregoing turbine sections, the seal may remain intact in response to at least one of the forward baffle or the aft baffle moving forward or aft.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
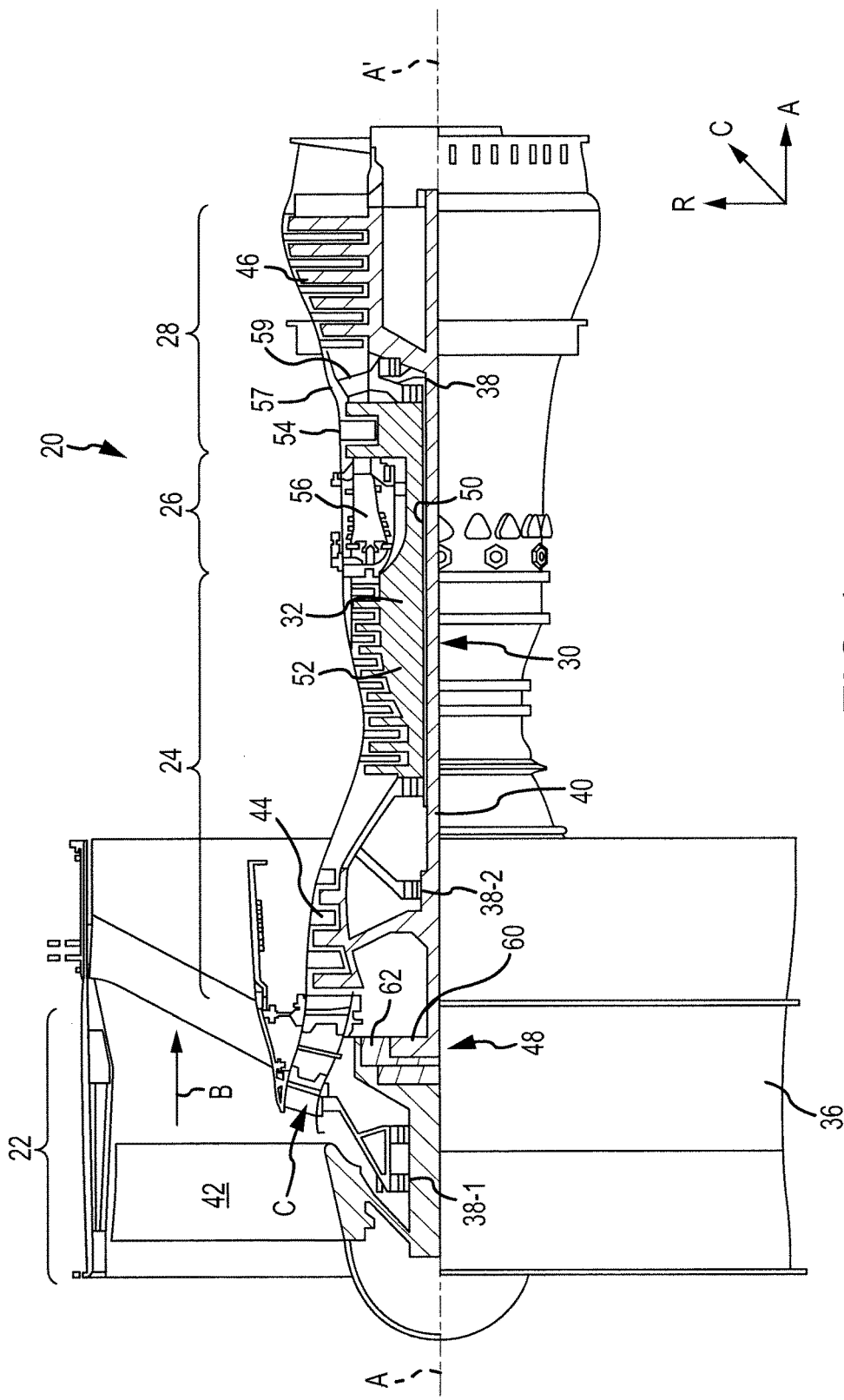
FIG. 1 is a cross-sectional view of an exemplary gas turbine engine, in accordance with various embodiments.

With reference to FIG. 1, a gas turbine engine 20 is provided. An A-R-C axis illustrated in each of the figures illustrates the axial (A), radial (R) and circumferential (C) directions. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction.

Gas turbine engine 20 may be a two-spool turbofan that generally incorporates a fan section 22, a compressor section 24, a combustor section 26 and a turbine section 28. Alternative engines include an augmentor section among other systems or features. In operation, fan section 22 drives air along a bypass flow-path B while compressor section 24 drives air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 generally comprise a low speed spool 30 and a high speed spool 32 mounted for rotation about an engine central longitudinal axis (or axis of rotation) A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 generally includes an inner shaft 40 that interconnects a fan 42, a low pressure (or first) compressor section 44 and a low pressure (or first) turbine section 46. Inner shaft 40 is connected to fan 42 through a geared architecture 48 that can drive fan 42 at a lower speed than low speed spool 30. Geared architecture 48 includes a gear assembly 60 enclosed within a gear housing 62. Gear assembly 60 couples inner shaft 40 to a rotating fan structure. High speed spool 32 includes an outer shaft 50 that interconnects a high pressure (or second) compressor section 52 and high pressure (or second) turbine section 54. A combustor 56 is located between high pressure compressor 52 and high pressure turbine 54. A mid-turbine frame 57 of engine static structure 36 is located generally between high pressure turbine 54 and low pressure turbine 46. Mid-turbine frame 57 supports one or more bearing systems 38 in turbine section 28. Inner shaft 40 and outer shaft 50 are concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C is compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 is a high-bypass ratio geared aircraft engine. The bypass ratio of gas turbine engine 20 may be greater than about six (6). The bypass ratio of gas turbine engine 20 may also be greater than ten (10:1). Geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). The diameter of fan 42 may be significantly larger than that of the low pressure compressor section 44, and the low pressure turbine 46 may have a pressure ratio that is greater than about five (5:1). The pressure ratio of low pressure turbine 46 is measured prior to inlet of low pressure turbine 46 as related to the pressure at the outlet of low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in high pressure compressor 52 than are conventionally experienced. These higher operating temperatures and pressure ratios create operating environments that cause thermal loads that are higher than the thermal loads conventionally experienced, which may shorten the operational life of current components.

Figure 2:
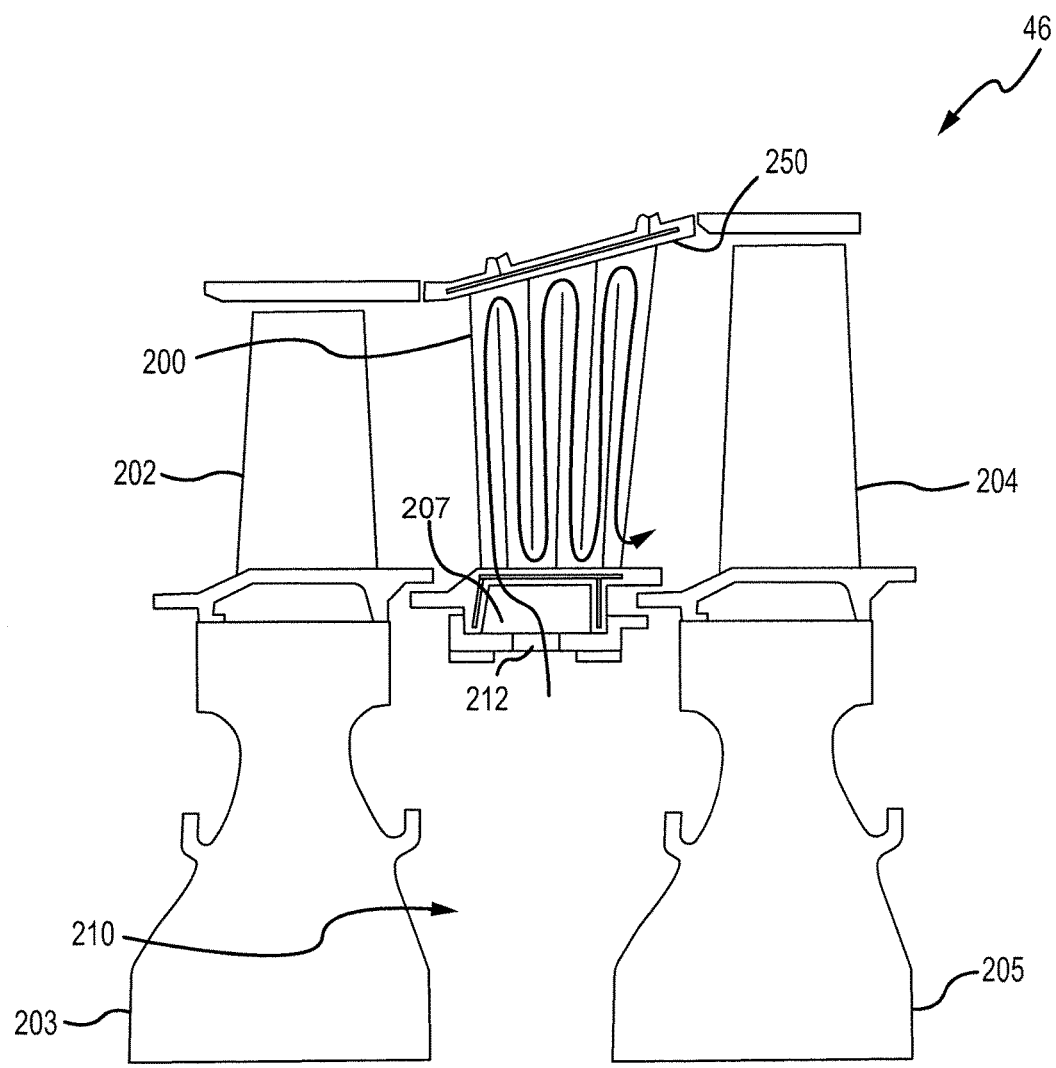
FIG. 2 is a cross-sectional view of a high pressure turbine section of the gas turbine engine of FIG. 1, in accordance with various embodiments.

With reference now to FIG. 2, a portion of low pressure turbine 46 is illustrated. Low pressure turbine 46 includes a first rotor 202 coupled to a first rotor disk 203 and a second rotor 204 coupled to a second rotor disk 205. A rotor cavity 210 may exist between the first rotor disk 203 and the second rotor disk 205. Low pressure turbine 46 may also include a vane 200. An outer diameter edge of vane 200 may be coupled to a platform 250. In response to fluid, such as air, flowing through low pressure turbine 46, first rotor 202 may rotate relative to vane 200 in the circumferential direction. The fluid may then be received by vane 200 which conditions the fluid prior to the fluid reaching second rotor 204. Second rotor 204, like first rotor 202, may rotate relative to vane 200 in the circumferential direction in response to receiving the flow of fluid.

Vane 200 may include a vane inner diameter (ID) cavity 207. A coolant, such as air, may flow through rotor cavity 210 and into vane ID cavity 207 via an orifice 212. The coolant may then flow into vane 200 and through serpentine turns of vane 200 in order to cool a pressure side (i.e., a concave side) and/or a suction side (i.e., a concave side) of vane 200. In various embodiments, the coolant may flow into a vane via a vane outer diameter cavity instead of an inner diameter cavity.

Figure 3:
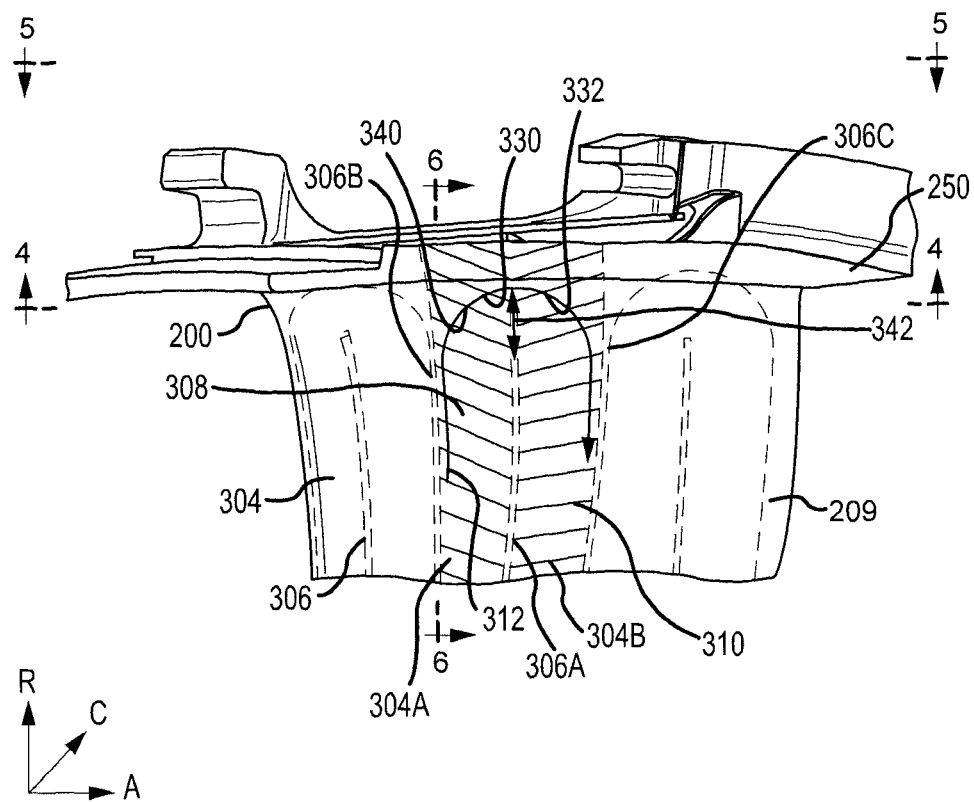
FIG. 3 is a cross-sectional view of a vane of the high pressure turbine section of FIG. 2, in accordance with various embodiments.

With reference now to FIG. 3, the serpentine turns of vane 200 may include a plurality of passages 304 separated and defined by a plurality of ribs 306. Stated differently, vane 200 defines an internal cavity 209 and includes ribs 306 defining passages 304. In various embodiments, vane 200 may include any number of passages 304 and any number of ribs 306. The passages 304 are each separated by ribs 306. With brief reference to FIG. 6, the passages 304 may be radially bound by a collar 606.

Returning to FIG. 3, the middle two passages of vane 200 include a forward passage 304A and an aft passage 304B. Forward passage 304A may be defined axially between a forward rib 306B and a middle rib 306A. Aft passage 304B may be axially defined between middle rib 306A and an aft rib 306C. In various embodiments, a forward baffle 308 may be positioned in forward passage 304A and an aft baffle 310 may be positioned in aft passage 304B. In various embodiments, a baffle may be positioned in any of the passages 304.

Figure 6:
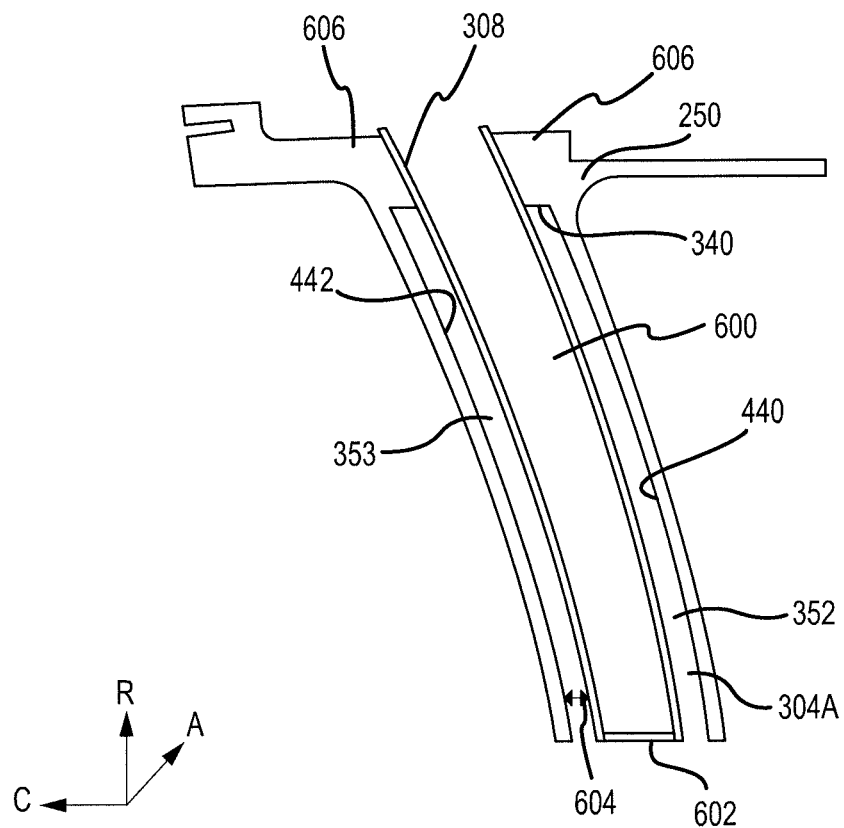
FIG. 6 is a view of a slice the vane of FIG. 3 along the line 6-6 of FIG. 3, in accordance with various embodiments.

With brief reference to FIGS. 3 and 6, an inner surface 340 of collar 606 may define the radially outward edges of forward passage 304A and aft passage 304B. Returning to FIG. 3, inner surface 340 may extend from forward rib 306B to aft rib 306C. Inner surface 340 may be separated from middle rib 306A by a gap 342. Inner surface 340 may have a radially outward curve 330 within forward passage 304A and a radially inward curve 332 in aft passage 304B. In various embodiments, radially outward curve 330 and/or radially inward curve 332 may have a radius of curvature between 0.25 inches (6.35 mm) and 0.35 inches (8.89 mm).

Figure 4:
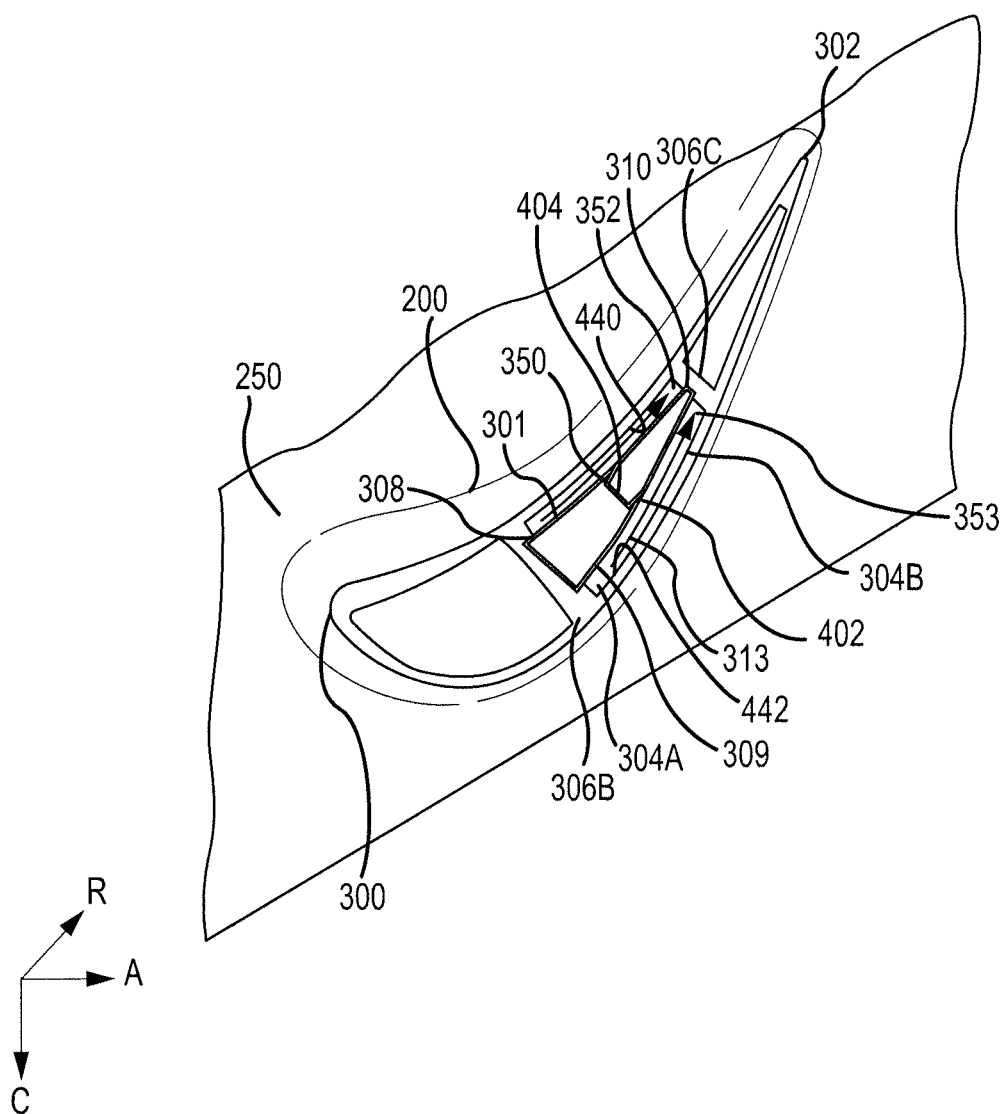
FIG. 4 is a cross-sectional radially inward view of the vane of FIG. 3 along the line 4-4 of FIG. 3, in accordance with various embodiments.
Figure 5:
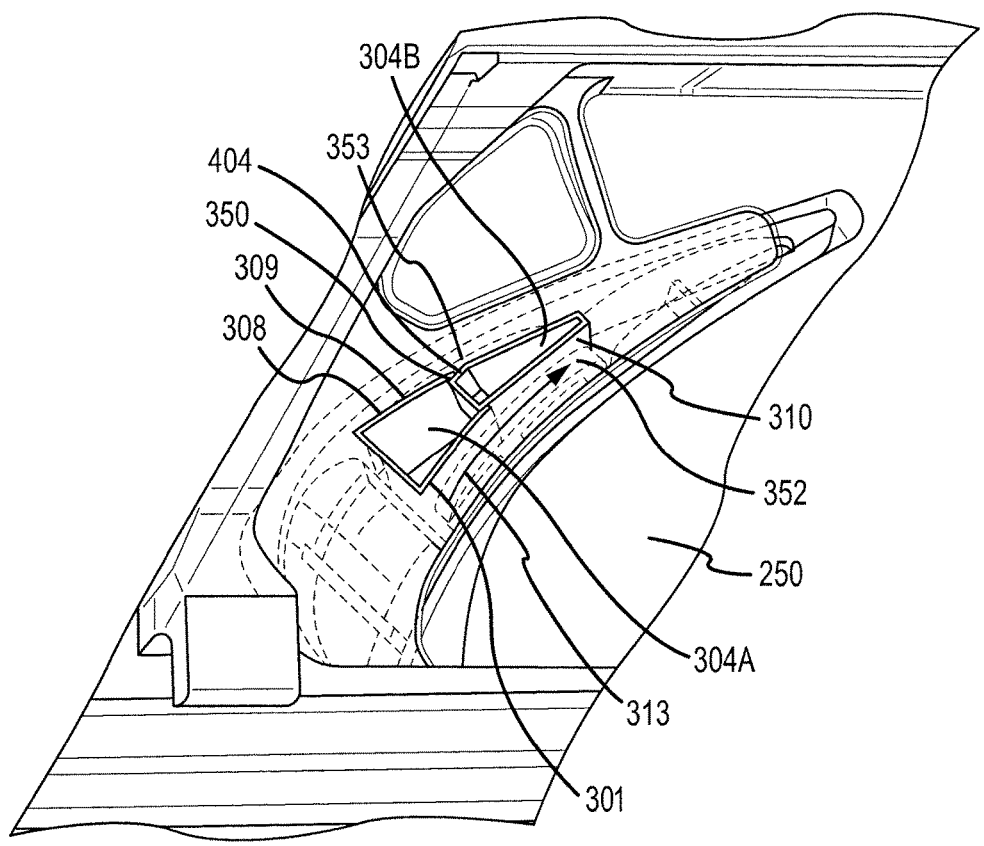
FIG. 5 is a radially inward perspective view of the vane of FIG. 3 along the line 5-5 of FIG. 3, in accordance with various embodiments.

With reference now to FIGS. 4 and 5, vane 200 may have a first circumferential surface 440 and a second circumferential surface 442 defining the circumferential ends of forward passage 304A and aft passage 304B. Forward baffle 308 and aft baffle 310 may be separated from first circumferential surface 440 by a space 352 and from second circumferential surface 442 by a space 353. During use, one radial end of forward baffle 308 and aft baffle 310 may be sealed such that air does not flow through forward baffle 308 and/or aft baffle 310. Thus and with reference to FIGS. 3, 4, and 5, air may flow radially via space 352 and space 353. Accordingly, air may flow radially outward, as illustrated by arrow 312, in space 352 through forward passage 304A. The air may then flow axially aft at a location radially outward from middle rib 306A as illustrated by arrow 313. The air may then flow radially inward via space 352 of aft passage 304B, also illustrated by arrow 312. Thus, the cooling air will be in contact with first circumferential surface 440 and allow heat to transfer therefrom. Air may flow in a similar manner through space 353 and forward passage 304A and aft passage 304B, thus allowing heat to transfer via second circumferential surface 442.

Returning to FIGS. 4 and 5, forward baffle 308 may include a first circumferential side 301 and a second circumferential side 309. A slot 350 may be defined between first circumferential side 301 and second circumferential side 309 at an aft end 402 of forward baffle 308. Aft baffle 310 may have a forward tapered end 404 on a forward end of aft baffle 310. In various embodiments, the tapered part of forward tapered end 404 and slot 350 may be positioned radially outward from middle rib 306A. In response to the baffles being positioned within forward passage 304A and aft passage 304B, forward tapered end 404 may be positioned within slot 350 such that first circumferential side 301 and second circumferential side 309 contact forward tapered end 404.

In various embodiments, manufacturing tolerances may cause the position of middle rib 306A to move forward or aft relative to forward rib 306B and aft rib 306C between various manufactured turbine sections. Because slot 350 and forward tapered end 404 are positioned radially outward from middle rib 306A, the overlap of slot 350 and forward tapered end 404 allow axial positioning of middle rib 306A to occur without breaking a seal between forward baffle 308 and aft baffle 310. Stated differently, in response to forward or aft positioning of middle rib 306A, first circumferential side 301 and second circumferential side 309 may remain in contact with forward tapered end 404, preventing air from flowing therebetween.

As disclosed above and with reference to FIGS. 3, 4, and 5, inner surface 340 may have a radially outward curve 330 and a radially inward curve 332. In various embodiments, radially outward curve 330 and/or radially inward curve 332 may exist circumferentially outward from one or both circumferential sides of forward baffle 308 and/or one or both circumferential sides of aft baffle 310 (i.e., not at the same axial and circumferential positions relative to forward baffle 308 and/or aft baffle 310).

With reference now to FIG. 6, platform 250 may include a collar 606 about a radially outward end of forward passage 304A and aft passage 304B. Forward baffle 308 may be inserted into forward passage 304A via an aperture defined by collar 606. When forward baffle 308 is entirely received by forward passage 304A, radially outward circumferential ends of forward baffle 308 may be in contact with collar 606. In various embodiments, collar 606 may be brazen, welded, or otherwise coupled to forward baffle 308A, reducing the likelihood of forward baffle 308 becoming removed from forward passage 304A. The radially inward face of collar 606 forms inner surface 340, as well as radially outward curve 330 and radially inward curve 332 at the end of forward passage 304A and aft passage 304B.

As illustrated, space 353 has a distance 604 between forward baffle 308 and second circumferential surface 442. In various embodiments, it may be desirable to prevent air from flowing through an internal volume 600 defined by forward baffle 308. In order to prevent this flow of air, forward baffle 308 may include a sealed end 602. As shown in FIG. 6, sealed end 602 is positioned at a radially inward end of forward baffle 308. In various embodiments, a radially outward end of forward baffle 308 may additionally or instead be sealed.

The serpentine turns and baffles are described herein with reference to vane 200 of high pressure turbine section 54. However, one skilled in the art will realize that they are equally applicable to vanes within low pressure turbine section 46 and to stators within compressor section 24 of gas turbine engine 20. Although the disclosure is directed to baffles used in outer diameter turns, one skilled in the art will realize that the disclosure is equally applicable to baffles for use with inner diameter turns. (For example and with reference to FIG. 3, inner surface 340 may instead be positioned on a radially inward end of an airfoil, radially outward curve 330 may be positioned at a radially inward end of a baffle as a radially inward curve, and radially inward curve 332 may be positioned at the radially inward end of the baffle as a radially outward curve.)

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A vane for use in a gas turbine engine, the vane comprising:
   a forward rib and an aft rib positioned axially aft of the forward rib;
   a forward baffle and an aft baffle such that at least one of the forward baffle or the aft baffle has a sealed radial end positioned at a radially inner end thereof;
   a middle rib positioned axially between the forward rib and the aft rib, such that the forward rib and the middle rib define a forward passage configured to receive the forward baffle, and the middle rib and the aft rib define an aft passage configured to receive the aft baffle such that the forward baffle and the aft baffle are configured to prevent airflow from being received by an internal volume of the forward baffle and of the aft baffle via at least one of the forward passage or the aft passage; and an inner surface extending axially from the forward rib to the aft rib, being radially separated from the middle rib via a gap such that air can flow between the aft passage and the forward passage via the gap, and having a radially outward curve from the forward rib to the middle rib and having a radially inward curve from the middle rib to the aft rib.

2. The vane of claim 1, wherein in response to the forward passage receiving the forward baffle and the aft passage receiving the aft baffle, air flows between the aft passage and the forward passage on a circumferential side of at least one of the aft baffle or the forward baffle.

3. The vane of claim 1, wherein the radially outward curve and the radially inward curve are positioned at an outer diameter edge of the vane.

4. The vane of claim 1, wherein the vane further defines two passages forward of the forward rib and two passages aft of the aft rib.

5. The vane of claim 1, further comprising a collar extending radially outward from the inner surface and configured to be positioned adjacent the forward baffle on a circumferential side of the forward baffle.

6. The vane of claim 5, wherein the collar is configured to be coupled to the forward baffle via welding.

7. The vane of claim 1, wherein the forward baffle and the aft baffle overlap at a location radially outward from the middle rib.

8. The vane of claim 7, wherein the forward baffle includes a first circumferential side and a second circumferential side defining a slot at an aft end of the forward baffle and the aft baffle includes a forward tapered end configured to be received by the slot, the slot and the forward tapered end being positioned radially outward from the middle rib.

9. The vane of claim 8, wherein a seal is formed between the forward tapered end and the forward baffle that remains sealed in response to at least one of the forward baffle or the aft baffle moving forward or aft.

10. The vane of claim 1, wherein at least one of the radially outward curve or the radially inward curve has a radius of curvature between 0.25 inches and 0.35 inches.

11. A system for reducing pressure loss in a serpentine turn of a vane of a gas turbine engine, the system comprising:
   a forward baffle configured to be received by a forward passage of the vane that is separated from an aft passage of the vane by a middle rib, the middle rib being separated from an inner surface of the vane by a gap, the forward baffle having a first circumferential side and a second circumferential side and a slot therebetween on an aft end of the forward baffle, the slot being positioned radially outward from the middle rib; and
   an aft baffle configured to be received by the aft passage of the vane and having a forward tapered end radially outward from the middle rib and configured to be received by the slot,
   wherein at least one of the forward baffle or the aft baffle has a sealed radial end positioned at a radially inner end thereof, such that the forward baffle and the aft baffle are each configured to prevent airflow from being received by an internal volume of the forward baffle and of the aft baffle via at least one of the forward passage or the aft passage.

12. The system of claim 11, further comprising the vane having the forward passage and the aft passage, wherein the forward baffle is received by the forward passage and the aft baffle is received by the aft passage, and wherein a seal is formed radially outward from the middle rib by the forward tapered end being received by the slot.

13. The system of claim 12, wherein the seal remains intact in response to at least one of the forward baffle or the aft baffle moving forward or aft.

14. The system of claim 12, further comprising a forward rib positioned axially forward of the middle rib and an aft rib positioned axially aft of the middle rib, wherein the inner surface extends axially from the forward rib to the aft rib and has a radially outward curve from the forward rib to the middle rib and having a radially inward curve from the middle rib to the forward rib.

15. The system of claim 14, wherein at least one of the radially outward curve or the radially inward curve has a radius of curvature between 0.25 inches and 0.35 inches.

16. The system of claim 14, wherein the radially outward curve and the radially inward curve are positioned at an outer diameter edge of the vane.

17. The system of claim 12, further comprising a collar extending radially outward from the inner surface, wherein in response to the forward passage receiving the forward baffle, the collar is positioned adjacent the forward baffle on either circumferential side of the forward baffle and configured to be coupled to the forward baffle.

18. A turbine section of a gas turbine engine comprising:
   a rotor configured to rotate in response to a flow of air; and
   a vane having:
      a forward rib and an aft rib positioned axially aft of the forward rib,
      a middle rib positioned axially between the forward rib and the aft rib, such that the forward rib and the middle rib define a forward passage and the middle rib and the aft rib defining an aft passage,
      a forward baffle positioned in the forward passage and having a first circumferential side and a second circumferential side and a slot therebetween on an aft end of the forward baffle, the slot being positioned radially outward from the middle rib,
      an aft baffle having a forward tapered end radially outward from the middle rib and configured to be received by the slot, forming a seal such that air cannot flow through the aft baffle and the forward baffle, and
      an inner surface extending axially from the forward rib to the aft rib, being radially separated from the middle rib via a gap such that air can flow between the aft passage and the forward passage via the gap, and having a radially outward curve from the forward rib to the middle rib and having a radially inward curve from the middle rib to the aft rib
      wherein at least one of the forward baffle or the aft baffle has a sealed radial end positioned at a radially inner end thereof, such that the forward baffle and the aft baffle are configured to prevent airflow from being received by an internal volume of the forward baffle and of the aft baffle via the forward passage or the aft passage.

19. The turbine section of claim 18, wherein the inner surface is straight at a first location radially outward from the forward baffle and is straight at a second location radially outward from the aft baffle when the forward passage receives the forward baffle and the aft passage receives the aft baffle.

20. The turbine section of claim 18, wherein the seal remains intact in response to at least one of the forward baffle or the aft baffle moving forward or aft.

\* \* \* \* \*